United States Patent

[11] 3,554,363

| [72] | Inventor | Hubert Jean Elineau<br>Versailles, France |
|---|---|---|
| [21] | Appl. No. | 706,912 |
| [22] | Filed | Feb. 20, 1968 |
| [45] | Patented | Jan. 12, 1971 |
| [73] | Assignee | R. Senard et Fils<br>Maromme, Seine-Maritime, France |
| [32] | Priority | Feb. 21, 1967 |
| [33] | | France |
| [31] | | No. 7172 |

[54] CONVEYOR, PARTICULARLY FOR BARS OR SIMILAR OBJECTS
4 Claims, 4 Drawing Figs.

[52] U.S. Cl. .................................................. 198/219,
74/660
[51] Int. Cl. .................................................. B65g 25/04,
B65g 25/02
[50] Field of Search ........................................ 198/219;
74/660

[56] References Cited
UNITED STATES PATENTS

| 1,139,027 | 5/1915 | George .................. | 198/219 |
| 3,225,905 | 12/1965 | LaBelle .................. | 198/219 |
| 2,528,963 | 11/1950 | Looney .................. | 74/660 |

Primary Examiner—Richard E. Aegerter
Assistant Examiner—Roger S. Gaither
Attorney—Sparrow and Sparrow ABSTRACT: A conveyor for transferring of bars or similar objects has a plurality of units which are disposed parallel to one another in a substantially horizontal manner. Each one of the units comprises at least one stationary and one movable beam, the movable beams being driven by a planetary mechanism which causes an epicycloidal translatory movement of the movable beams.

PATENTED JAN 12 1971

INVENTOR
Hubert Jean Elineau
By
Sparrow and Sparrow
ATTORNEYS

INVENTOR
HUBERT JEAN ELINEAU
BY
SPARROW AND SPARROW
ATTORNEYS

CONVEYOR, PARTICULARLY FOR BARS OR SIMILAR OBJECTS

The present invention relates to a conveyor to be used more particularly, but not exclusively, for transferring objects such as metallic bars, steel sections and similar other objects.

For transferring such objects it is common practice in the metal industry, especially in rolling mills, to use chain conveyors. In particular for transferring a set of bars that are brought on an intake table, where the bars are supported by rollers, to a parallel outlet table where the bars are taken over by other rollers, a conveyor with parallel endless chains is used. The chains can be lifted above the intake table rollers for removing the bars that are brought on the table and lowered beneath the outlet table rollers, so that the bars can be supported on the latter and taken off by them. The prior art knows such endless chain conveyors, that can move vertically on at least one fraction of their path. They are comparatively complicated to build, and consequently costly; the maintenance of the chains on these conveyors necessitates frequent lubrication, that is often difficult to carry out; besides, the chains are prone to stretch and must consequently be submitted to adjustments; the return path of the chains beneath the run of the transported objects takes up a great deal of space and this usually necessitates digging of deep pits under the conveyor; the parts that carry the chains must be supported and guided; furthermore, the chains are noisy when working.

The object of the present invention is to remedy these various drawbacks by producing a conveyor that complies better than the existing conveyors with the requirements of practice, whilst presenting various additional advantages.

The invention consists mainly in constituting a conveyor by means of a sequence of parallel devices, each comprising at least a fixed beam and a mobile beam that are parallel and set out in an essentially horizontal way, the mobile beam being driven by a gear mechanism with sun-and-planet spur gears that carries out on the aforesaid beam an epicycloidal translation movement.

The invention also consists in certain other arrangements which are mentioned hereinafter, and preferably used together with the aforesaid main arrangement.

The invention relates more especially to certain methods of application and realization of these arrangements; it relates even more especially and as new industrial products to conveyors of the above type, to the assemblies comprising these conveyors together with the elements and tools suitable to produce them.

As a mere example and to facilitate the understanding of the invention a description is given hereinafter of a particular method of realization of the invention represented in a diagrammatical and not limitative way on the attached drawing, on which:

Figure 1:
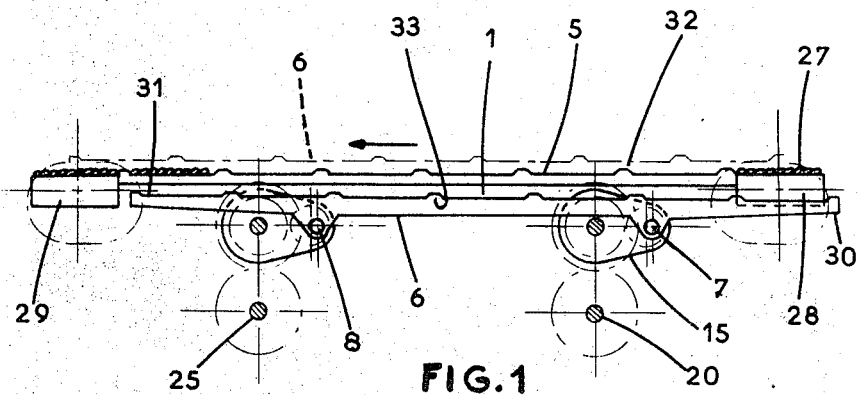
FIG. 1 is a vertical section, along plane A-A, of FIG. 2, of a conveyor, according to the invention, this section showing in elevational view one of the arrangements of the conveyor.
Figure 2:
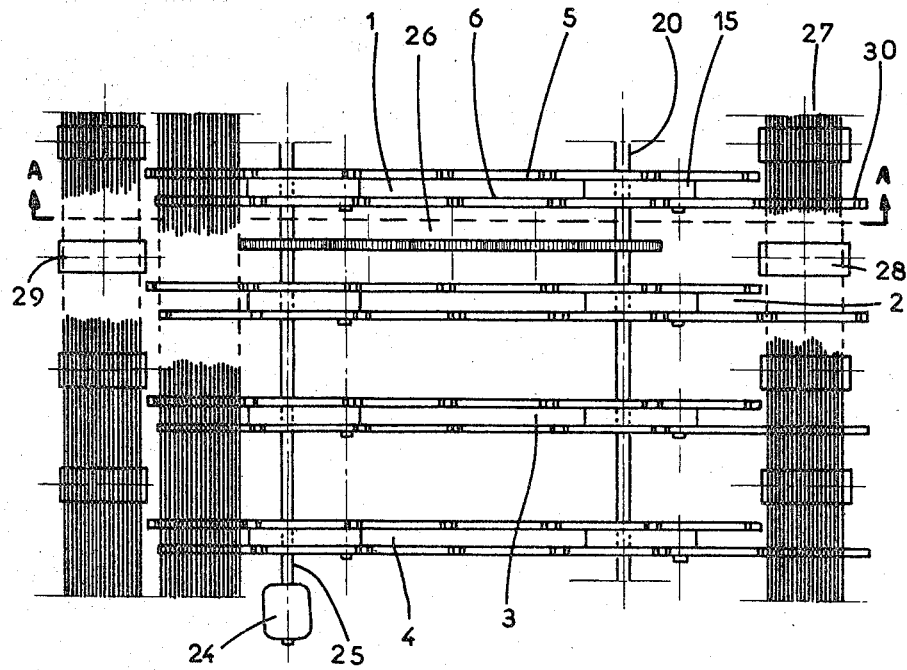
FIG. 2 is a partial drawing, in top plan view, of the aforesaid conveyor.
Figure 3:
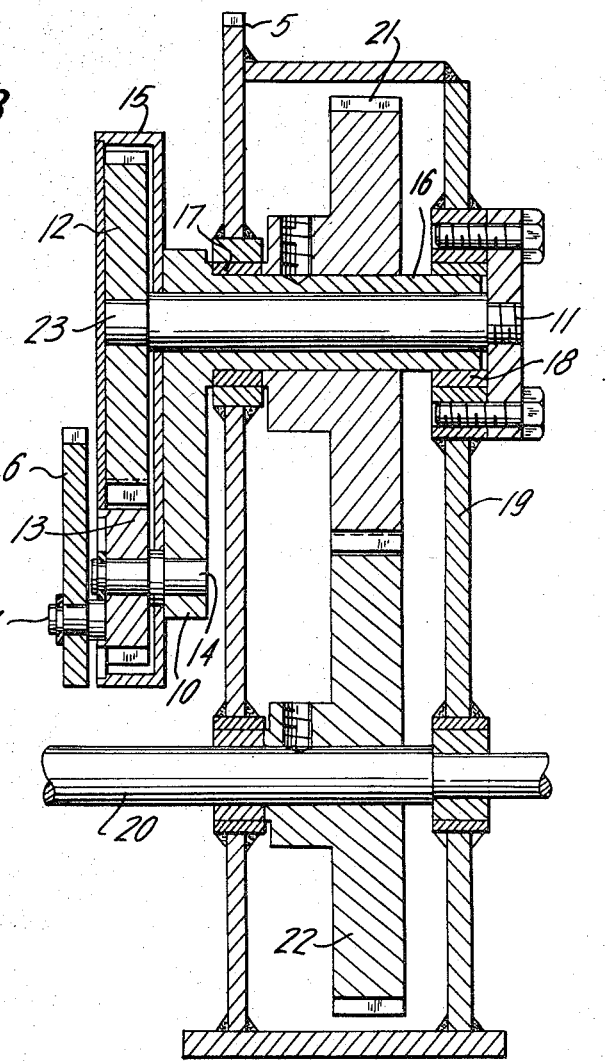
FIG. 3 shows, on a larger scale, a vertical section of a mechanism of the conveyor.
Figure 4:
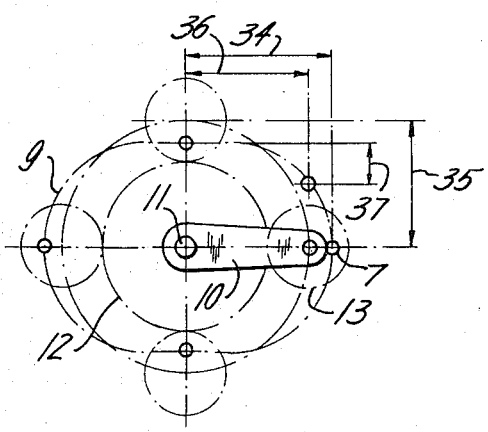
FIG. 4 shows the kinematics of this mechanism.

If it is intended to build a conveyor according to the invention and, more especially, according to one of its methods of application and to those methods of realization of its various parts, to which is seems that preference should be given, one proceeds in the following or in a similar way.

The conveyor is constituted by means of a sequence of parallel devices 1, 2, 3, 4, each comprising at least one fixed beam 5 and one mobile beam 6. Beams 5 and 6 are parallel and disposed horizontally in the represented example.

Beam 6 is supported by two crank pins 7, 8, that move in a parallel way along shortened epicycloids 9. To this effect each crankpin for instance crankpin 7 is actuated by a mechanism that comprises a crank arm 10 rotating around a shaft 11, a fixed planet gear 12, coaxial with shaft 11, and a free gear 13 that meshes with planet gear 12. Free gear 13 rotates around shaft 14 connected to crank arm 10; crankpin 7 is connected with free gear 13. Gears 12 and 13 are housed in a gear case 15 fixed on crank arm 10. This crank arm is rotated by tubular shaft 16, that rotates in bearings 17, 18 of a fixed gear case 19. Shaft 16 is actuated by shaft 20, that is common to the various devices 1, 2, 3, 4, by means of a drive with gears 21, 22. The stationary planet gear 12 is held by a shaft 23 housed inside tubular shaft 16 and fixed on gear case 19.

Shaft 20 is driven by a motor 24 by means of a shaft 25, the function of which is similar to the one of shaft 20, and of a geartrain 26.

Bars 27 or other similar elongated objects to be transferred by the conveyor according to the invention from an intake table with rollers 28 to an outlet table 29 with rollers are lifted by the ends 30 of mobile beams 6, the beams being parallel to the axis of the rollers. In a similar way as devices called "walking beam" mobile beams 6 and fixed beams 5 cause bars 27 to advance step-by-step towards roller table 29 and, finally, the ends 31 of beams 6 deposit these bars 27 on rollers 29 of the outlet table.

To avoid gliding or rolling of the bars or other transferred objects, beams 5 and 6 may carry on their upper surface protrusions or teeth such as 32, 33.

The shortened epicycloid 9 along which the epicycloidal translation of beam 6 takes place, is featured by geometrical half-step and lift marked in 34, 35, respectively, on the drawing. The half-step and the lift, actually used for the transfer of objects, depend of course on the position of fixed beam 5. These effective half-step and lift movement are marked in 36, 37, respectively. An effective step equal to five times the effective lift may be indicated by way of example.

The epicycloidal translation conveyor according to the invention offers furthermore the advantage of clearing nearly instantaneously the intake table of the bars or of similar objects which are on it; these objects can consequently be replaced with others. It is further possible to transfer simultaneously several sets of these bars or objects. Finally, the length of the walking beam conveyor remains shorter than the length of an equivalent conveyor with chains, the return wheels for the chains being of course being non existent. The invention is obviously not limited to the given methods of application and realization, it also comprises all its variants.

I claim:

1. In a conveyor for transferring of bars and of similar objects, the combination with a plurality of parallel devices, each one of said devices including at least one stationary beam and one movable beam, said beams being disposed parallel to one another and located in an essentially horizontal manner, of a gear mechanism comprising sun-and-planet spur gears, said mechanism driving said movable beam in an epicycloidal translatory motion.

2. In a conveyor according to claim 1, said gear mechanism comprising two crankpins supporting said movable beam, a free gear and a stationary planet gear, each one of said crankpins being actuated by said free gear and said stationary gear.

3. In a conveyor according to claim 1, said beams having toothlike protrusions on the upper surface thereof.

4. In a conveyor according to claim 1, at least one table having rollers, said rollers being parallel to the axis of said conveyor beams.